United States Patent [19]
Plank et al.

[11] Patent Number: 4,499,761
[45] Date of Patent: Feb. 19, 1985

[54] SNOW SCALE/RATE METER

[75] Inventors: Vernon G. Plank, Mansfield; Anthony J. Matthews, Salisbury, both of Mass.; Robert O. Berthel, Windham, N.H.; Dennis L. LaGross, Bedford, Mass.

[73] Assignee: The United States of America as represented by the Secretary of the Air Force, Washington, D.C.

[21] Appl. No.: 442,494

[22] Filed: Nov. 18, 1982

[51] Int. Cl.³ .............................................. G01W 1/14
[52] U.S. Cl. .................................... 73/170 R; 73/171
[58] Field of Search ...................... 73/171, 170 R, 188; 116/264; 177/245

[56] References Cited

U.S. PATENT DOCUMENTS

| | | |
|---|---|---|
| 417,357 | 12/1889 | Fergusson. |
| 2,954,690 | 10/1960 | Dickinson ............................ 73/171 |
| 3,440,396 | 4/1969 | Greene .............................. 73/170 R |
| 3,456,505 | 7/1969 | Schindelholz ..................... 73/170 R |
| 3,487,684 | 12/1967 | Chadwick ............................ 73/171 |
| 3,522,858 | 7/1968 | Christensen ........................ 177/208 |
| 3,690,169 | 9/1972 | Santeford et al. ..................... 73/171 |
| 4,210,216 | 7/1980 | Godden ............................. 177/245 |

OTHER PUBLICATIONS

Elementary Meteorology by Taylor, Aug. 1954, pp. 54–55, FIGS. 2-26 and 2-28.
Jairell, Robert L., "An Improved Recording Gage for Blowing Snow," *Water Resources Research*, vol. 11, No. 5, Oct. 1975, pp. 674–680.

*Primary Examiner*—Charles Frankfort
*Assistant Examiner*—Denis E. Corr
*Attorney, Agent, or Firm*—Donald J. Singer; Jacob N. Erlich

[57] ABSTRACT

A snow scale/rate meter having a highly accurate weight sensing device enclosed in a thermally controlled environment. A clear plastic collection bucket is operably connected by means of an elongated shaft to the weight sensing device. In addition, a plurality of wind protection device surround the collection bucket as well as limit collected snowfall to snowfall having trajectories of 45° or less from the vertical. Snowfall weight and rate data can be accurately provided by this meter over extremely short intervals of times during in-the-field operation.

10 Claims, 3 Drawing Figures

SNOW SCALE/RATE METER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to devices capable of weighing snow and determining snowfall rate, and, more particularly, to a snow scale/rate meter which is capable of accurately determining short term variations in snow weight measurements as well as the rate of snowfall.

It has long been recognized that electro-optical and communications systems are especially susceptible to attenuation because of falling snow. Therefore, it becomes extremely important to document snow rate, or the amount of snow deposited on a surface in a given amount of time. By analyzing this information, it is possible to determine the intensity of falling snow. Accordingly, steps may then be taken to lessen the attenuation effects cause by the naturally falling snow. In addition, it is essential that the above determinations be made with "naturally falling" snow in an in-the-field environment and be limited to falling snow having a trajectory of 45° or less from the vertical. Heretofore, devices utilized in measuring snow weight or snowfall rates were limited to determining the weight of snow or its depth over relatively long periods of time (hours or large fractions thereof). Short term variations, in the order of minutes, were commonly inferred from the longer time rates by the use of some form of probabalistic model. Rates over short time intervals were generally not measured.

Therefore, it is extremely essential for a better understanding of the attenuation effects of falling snow on electro-optical and communications systems to provide a device which is capable of determining both snow weight measurements and rate of snowfall over short term variations such as minutes. In addition, it is essential that these measurements be made under naturally occuring conditions and in the field.

SUMMARY OF THE INVENTION

The present invention overcomes the problems encountered in the past and as set forth above by providing a snow scale/rate meter which is capable of accurately delineating short term variations in snow weight measurements and snowfall rate.

The present invention utilizes a conventional electronic balance sensitive to approximately 0.01 grams as an essential component thereof. This balance includes a weighing pan and a remote sensing head. A modified, elongated shaft or rod interconnects the weighing pan with the sensing head. As a result, with the snow scale/rate meter of this invention, the sensing head can be enclosed in a heated compartment with the weighing platform and snow collection bucket situated remotely from the heated enclosure.

A transparent, cylindrical wind shield, having a diameter larger than that of the collection bucket, is positioned about the shaft or rod. The wind shield, together with a uniquely designed baffle prevent blowing snow from entering the shaft port and therefore eliminates the problem of water seepage into the sensitive electronics of the sensing head. In addition, the collection bucket and wind shield are surrounded by an adjustable wind screen which is designed to limit the measurement of falling snow to snow having a specific trajectory such as 45° or less from the vertical. Further, a larger wind screen encompasses the above-mentioned components of the snow scale/rate meter in order to disrupt the more severe horizontal wind components and to protect the equipment from wind damage.

The snow collection bucket or container is preferably made of a transparent, plastic material and has calibration marks around the circumference thereof to allow depth measurements to be made of the collected snow in order for a subsequent determination of the density of snow to be performed. An annular-configured support barrier, having circumferentially spaced openings therein is interposed between the heated compartment and the wind shield in order to prevent heat which may escape from the heated compartment from affecting the snow within the collection bucket as well as eliminate differential pressure effects.

The digitized weight data received from the sensing head of the electronic balance is fed to an instrument control panel from which the information thereon is recorded on magnetic tape for future computer analysis of snowfall rate and snow density.

It is therefore an object of this invention to provide a device capable of accurately measuring the weight of naturally falling snow.

It is a further object of this invention to provide a device which is capable of accurately measuring naturally falling snow at short time intervals.

It is another object of this invention to provide a device which is capable of producing data which can be conveniently converted into terms of snow rate.

It is still another object of this invention to provide a snow scale/rate meter which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the apended claims.

DETAILED DESCRIPTION OF THE DRAWING

DETAILED DESCRIPTION OF THE PREFERRED EMBODIMENT

Figure 1:
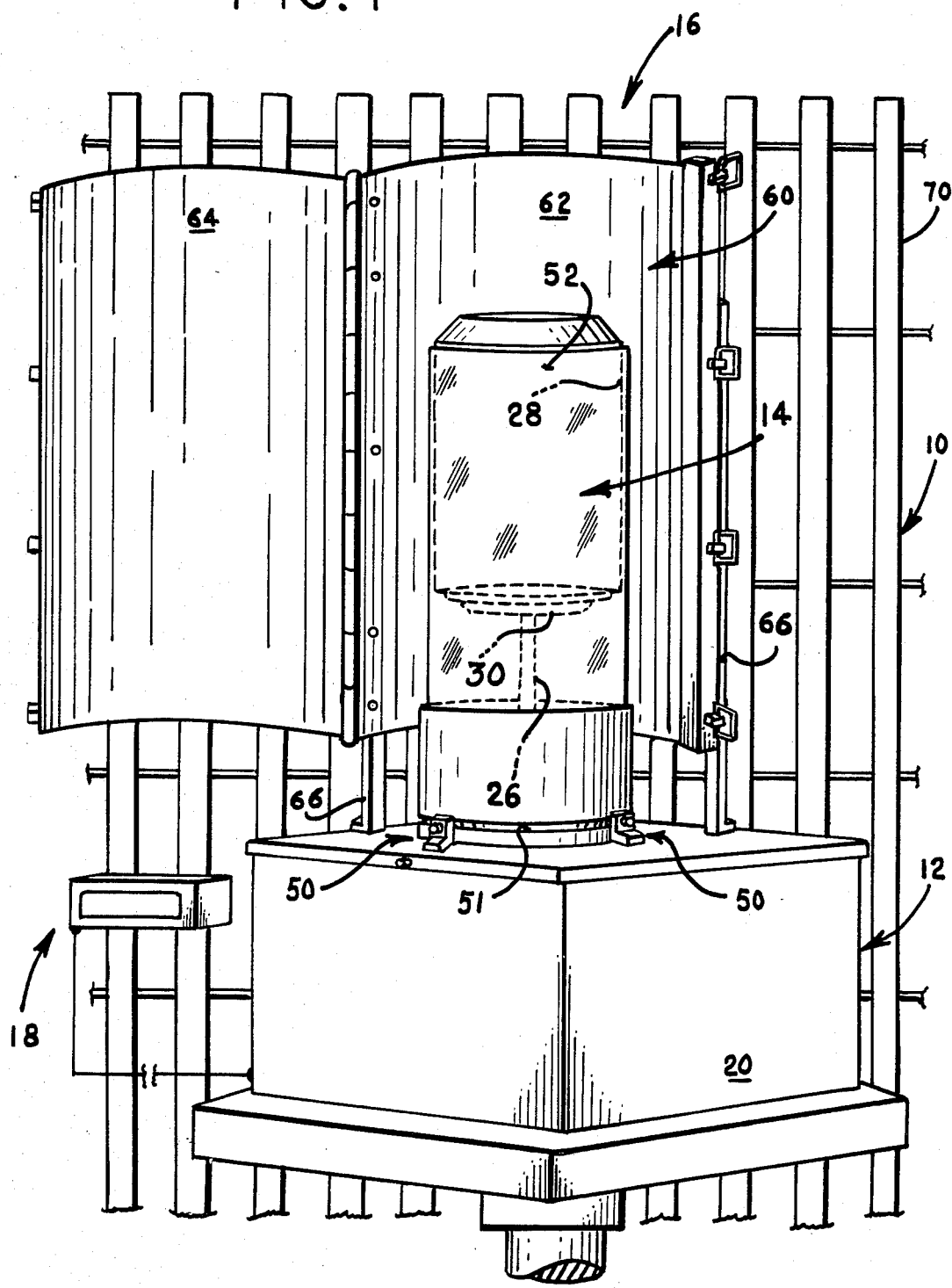
FIG. 1 is a pictorial representation of the snow scale/rate meter of this invention.

Reference is now made to FIG. 1 of the drawing which pictorially illustrates snow scale/rate meter 10 of the present invention. Snow scale/rate meter 10 of this invention is made up of four major components; (1) a sensing unit 12, (2) a collection unit 14, (3) a protection system 16, and (4) a monitoring unit 18.

Figure 2:
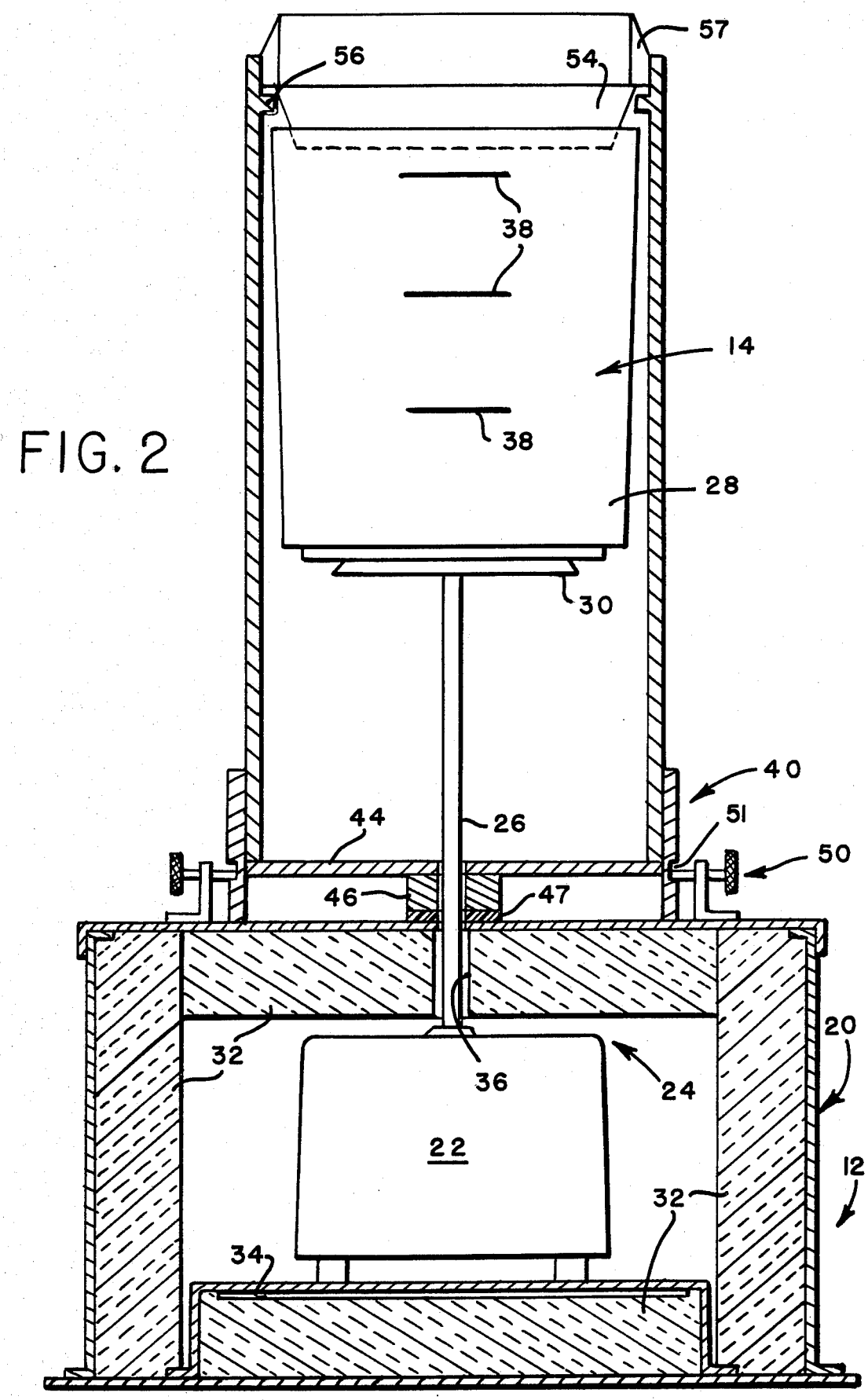
FIG. 2 is a side elevational view of the snow scale/rate meter of the present invention and shown partly in cross-section.

The sensing unit 12 as clearly shown in FIGS. 1 and 2 of the drawing, includes an enclosure or compartment 20 for thermally insulating therein a remote sensing head 22 (clearly shown in FIG. 2 of the drawing) of a conventional electronic balance 24 capable of providing sensitivity of approximately 0.01 grams. An example of such an electronic balance which incorporates therein a remote sensing head designated as element 22 in FIG. 2 of the drawing is ScienTech Model 3340 Electronic Balance. Forming part of electronic balance 24 is a rod or shaft 26 which has been substantially elongated for use with the present invention in order to operably interconnect remote sensing head 22 with a snow collection bucket or container 28 removed therefrom. As shown clearly in FIG. 2 of the drawing, the collection bucket 28 rests upon a weighing platform 30 which can be formed as part of the shaft or rod 26.

Referring once again to enclosure 20, its makeup is generally of a sheet metal construction having thermally insulated portions 32 made preferably of styrofoam insulation surrounding sensing head 22. In addition, a conventional thin sheet heater 34 which can be thermostatically controlled is mounted within enclosure 20 and is utilized to maintain a proper operating temperature for the sensing head 22 of balance 24. As also shown in FIG. 2 of the drawing the elongated shaft or rod 26 protrudes through an opening 36 in enclosure 20 so that the collection bucket or container 28 can remain isolated from the possible effects of escaping heat from enclosure 20.

Figure 3:
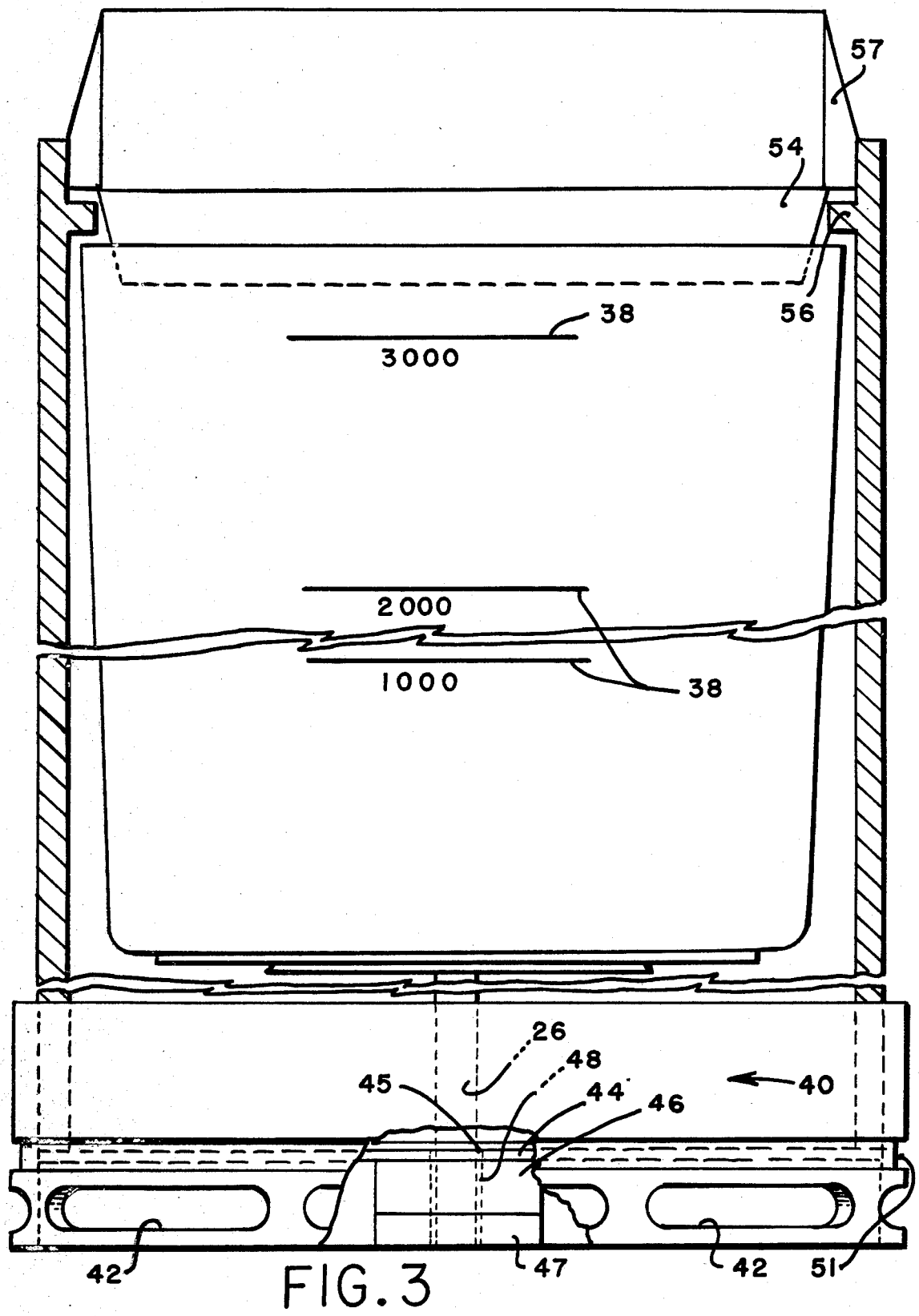
FIG. 3 is an enlarged, segmented side elevational view of a portion of the snow scale/rate meter of this invention and shown partly in cross-section.

A description of the collection unit 14 is now made with specific reference to FIGS. 2 and 3 of the drawing. The primary element of collection unit 14 is the collection bucket or container 28 mentioned above. Collection container 28 is preferably made of a transparent material of cylndrical shape and has its bottom contoured so that it can be centered upon the weighing platform 30. Generally, collection container 28 is made of clear plastic being 15.1 cm in diameter and having a 3 liter capacity. Calibration marks 38 are inscribed on the sides of the container 28 to allow for the volumetric estimates of snowfall accumulation. These estimates of snow volume when combined with the weight measurements provide the desired snow density.

Further included as part of the collection unit 14 is a heat dissipating support barrier 40 clearly shown in FIGS. 2 and 3 of the drawing. Barrier 40 is of an annular configuration having a plurality of circumferential openings 42 (see FIG. 3) therein. Openings 42 allow housing 40 to be vented to ambient air in the space between the top of heated compartment of enclosure 20 and the area just below collection container 28 as well as prevent the buildup of pressure differential effects.

A flat shelf or platform 44 is secured horizontally within barrier 40 at substantially the midpoint thereof. Platform 44 is used to support a wind shield 52 to be described in detail below. A centrally located opening 45 in platform 44 allows shaft 26 to pass therethrough. A guide 46 and any suitable seal or gasket 47 having centrally located openings 48 aligned with opening 45 are affixed to platform 44 so as to be interposed between the top of heated enclosure 20 and platform 44. Providing support barrier 40 within the present invention permits any excess heat emanating from enclosure 20 to dissipate through openings 42. A plurality of screw-type locking elements 50 as shown in FIG. 1 mate with a groove 51 in barrier 40 to secure barrier 40 in place.

A description of the protection system 16 of the present invention is now made with respect to FIGS. 1-3 of the drawing. System 16 includes wind shield 52 mentioned above which encompasses collection container 28. Wind shield 52 is preferably made of a transparent material, such as clear plastic so that one may make visual observations of the calibrations 38 on the collection container 28. This clear plastic wind shield 52 is utilized to reduce the effects of wind on the collection container 28 as well as to keep snow from accumulating on the moving parts of the collection unit 14 and sensing unit 12.

A thin copper annular-shaped updraft baffle 54 (see FIGS. 2 and 3) is fitted within but not in contact with container 28. Baffle 54 is held in place by resting against a circumferential lip 56 formed on the inner surface of wind shield 52. Baffle 54 prevents snow from falling between container 28 and wind shield 52 and therefore eliminates the adverse effects of snowfall upon the operation of the electronic sensing head 22. In addition, a tapered sampling lip 57 rests upon the top of baffle 57 to insure that snow entering snow scale/rate meter 10 is directed into container 28 and is not permitted to accumulate between the container 28 and the tubular-shaped wind shield 52. Wind shield 52 is securely positioned in place by resting upon platform 44 of barrier 40. Additional structural support for wind shield 52 is provided by the surrounding side structure of barrier 40.

Further making up protection system 16 of snow scale/rate meter 10, as shown in FIG. 1 of the drawing, is a vertical, adjustably mounted sheet metal windscreen 60 approximately 30.5 cm in diameter and approximately 23 cm in height. Windscreen 60 surrounds and is spaced apart from wind shield 52. Screen 60 is constructed of a pair of hinged sections 62 and 64 so that windscreen can be opened as shown in FIG. 1 to allow for viewing and providing access to the collection container 28. The sheet metal windshield 60 is adjustably secured to a pair of support arms or rods 66 which are fixedly attached to enclosure 20. Any suitable type of adjustable rail-type arrangement allows for screen 60 to be moved relative to wind shield 52. In this manner by adjusting the height of the windshield 60, the snow received by the collection container 28 is limited to those snowflakes having specific fall trajectories. A preferred trajectory for snowfall would be less than 45° from the vertical.

In addition an even larger wind fence 70 of approximately 5 meters completes protection system 16 and is installed in a position surrounding windscreen 60. Wind fence 70 helps disrupt some of the horizontal wind components and eddies of substantially larger size and therefore acts to insulate or isolate the collection container 28 and the weighing components of snow scale/rate meter 10 from the adverse effects of large amounts of wind.

Measurements of weight versus time data for the snow scale/rate meter 10 of this invention can be monitored on any recording unit 80 such as Tektronic Model 4923 Digital Recorder and subsequently recorded on any suitable magnetic tape at a remote location. Snow weight and height determinations over short term intervals are utilized in a conventional manner in order to ascertain both snow rate intensity as well density.

MODE OF OPERATION

In operation, snowfall, preferably limited to 45° or less from the vertical, is accumulated within the collection container 28 in order for measurements of its weight to be made over short intervals and in an extremely accurate manner by electronic balance 24. In addition, visual observations of the actual amount of snow contained within the collection container 28 can be ascertained by visual observation of the snow content in container 28. Timers (not shown) can be utilized in order to determine over what time period these collections are made and, therefore, digitized information with respect to weight can be utilized in determining snowfall rate intensity and density. All of these measurements can be made by the snow scale/rate meter 10 of the present invention in the field. They can be made accurately, and they can be made over short term time periods. The graduated, plastic collection container 28 is enclosed by a wind shield 52 which is subsequently enclosed by an additional windscreen 60 so as to prevent the adverse effects of wind from interfering with the weight measurements. Digitized weight measurements at approximately 2.7 second intervals can be recorded for later analysis. Periodic evaluation of the amount of snow deposited in collection container 28 will give an indication as to snow density.

Although this invention has been described with reference to a particular embodiment, it will be understood that this invention is also capable of further and other embodiments within the spirit and scope of the appended claims.

We claim:

1. A snow scale/rate meter comprising:
    means for collecting snowfall and providing a visual indication of the amount of said snowfall collected;
    means operably connected to said snowfall collection means for accurately ascertaining the weight of said collected snowfall, said weighing means including means substantially spaced-apart from said snowfall collection means for sensing said weight of said snowfall, and means for enclosing said weight sensing means in a thermally controlled environment;
    said snowfall collection means including means for dissipating heat emanating from said thermally controlled environment of said weight sensing means in order to prevent said heat from adversely affecting said collected snowfall;
    means operably associated with said snowfall collection means for substantially protecting said snowfall collection means from the adverse effects of wind; and
    means for monitoring and recording said weight of snowfall over preselected intervals of time;
    whereby accurate determinations of snowfall weight and rate can be ascertained over short intervals of time.

2. A snow scale/rate meter as defined in claim 1 wherein wind protection means comprises means for limiting said collected snowfall to snowfalls having trajectories of a preselected angle or less from the vertical.

3. A snow scale/rate meter as defined in claim 2 wherein said snowfall collection means includes means for preventing snowfall from adversely affecting the operation of said weighing means.

4. A snow scale/rate meter as defined in claim 3 wherein said protection means comprises three separate wind protection devices; the first of said wind protection devices being a cylindrically shaped, transparent shield surrounding said snowfall collection means; the second of said wind protection devices being a windscreen adjustably mounted around said wind shield and defining said snowfall trajectory limiting means; and the third of said wind protection devices being a wind fence surrounding said windscreen, said snowfall collection means and said snowfall weighing means.

5. A snow scale/rate meter as defined in claim 4 wherein said snowfall weighing means further comprises a platform operably connected to and held in spaced-apart relation to said weight sensing means by an elongated rod protruding through said thermally controlled enclosure.

6. A snow scale/rate meter as defined in claim 5 wherein said snowfall collection means further comprises a transparent snowfall collection bucket, said bucket being mounted upon said weighing platform.

7. A snow scale/rate meter as defined in claim 6 wherein said heat dissipating means is positioned between said weighing platform and said thermally controlled enclosure and comprises a support barrier having a support plate for mounting said wind shield thereon.

8. A snow scale/rate meter as defined in claim 7 wherein said windscreen comprises a pair of hinged sections, said sections being movable with respect to each other to a position to allow for the visual inspection of said collection bucket.

9. A snow scale/rate meter as defined in claim 8 wherein said means for preventing snowfall from adversely affecting the operation of said weighing means comprises an annular shaped baffle interposed between said collecting bucket and said wind shield.

10. A snow scale/rate as defined in claim 9 wherein said support barrier includes a centrally located guide for said elongated rod and a plurality of circumferentially spaced-apart openings.

* * * * *